US009866023B2

United States Patent
Ellerkamp et al.

(10) Patent No.: US 9,866,023 B2
(45) Date of Patent: Jan. 9, 2018

(54) SECURITY CONCEPT FOR INTEGRATING A BATTERY INTO AN INVERTER

(71) Applicant: SMA Solar Technology AG, Niestetal (DE)

(72) Inventors: Florian Ellerkamp, Kassel (DE); Aleksandra-Sasa Bukvic-Schaefer, Kassel (DE); Klaus Rigbers, Kassel (DE); Claus Allert, Kaufungen (DE)

(73) Assignee: SMA Solar Technology AG, Niestetal (DE)

( * ) Notice: Subject to any disclaimer, the term of this patent is extended or adjusted under 35 U.S.C. 154(b) by 277 days.

(21) Appl. No.: 14/734,354

(22) Filed: Jun. 9, 2015

(65) Prior Publication Data

US 2015/0288185 A1 Oct. 8, 2015

Related U.S. Application Data

(63) Continuation of application No. PCT/EP2012/074929, filed on Dec. 10, 2012.

(51) Int. Cl.
*H02J 3/06* (2006.01)
*H02J 3/32* (2006.01)
(Continued)

(52) U.S. Cl.
CPC ............... *H02J 3/06* (2013.01); *H02J 3/32* (2013.01); *H02J 3/382* (2013.01); *H02J 3/383* (2013.01);
(Continued)

(58) Field of Classification Search
CPC ...... H02J 3/06; H02J 3/32; H02J 3/383; H02J 7/35; H02J 13/0062; H02J 3/382;
(Continued)

(56) References Cited

U.S. PATENT DOCUMENTS 5,850,351 A * 12/1998 Lotfy ............... H02J 7/0022
340/636.15
6,081,177 A * 6/2000 Fausch ............. H01H 50/642
335/128
(Continued)

FOREIGN PATENT DOCUMENTS

| EP | 2346138 A2 | 7/2011 |
| JP | 2010178495 A | 8/2010 |
| WO | 2012034045 A1 | 3/2012 |

OTHER PUBLICATIONS

"Atmel Battery Management, Atmel Li-Ion Battery Management Solution for Automotive and Industrial Applications," 2011, 8 pages.
Li-ion Battery Management Monitoring Emergency and Backup Circuit, ATA6871 Preliminary, 23 pages.

*Primary Examiner* — Jared Fureman
*Assistant Examiner* — Rafael Pacheco
(74) *Attorney, Agent, or Firm* — Eschweiler & Potashnik, LLC

(57) ABSTRACT

An inverter apparatus includes an input stage receiving DC electric power from a DC power generator for loading a DC voltage link, a DC/AC converter connected to the DC voltage link and feeding AC electric power into a power grid. The apparatus further includes a bidirectional connection for loading a battery out of the DC voltage link and for loading the DC voltage link out of the battery, and a controller operating the DC/AC converter and the bidirectional connection. The controller receives present values of relevant parameters of the battery including working data at least related to a state of charge and safety data indicating a safety state of the battery from a battery monitoring unit. The controller, in operating the bidirectional connection, considers the working data and is commanded by the safety data.

22 Claims, 2 Drawing Sheets

(51) Int. Cl.
*H02J 3/38* (2006.01)
*H02J 7/35* (2006.01)
*H02J 13/00* (2006.01)

(52) U.S. Cl.
CPC ............ *H02J 7/35* (2013.01); *H02J 13/0062* (2013.01); *Y02E 10/563* (2013.01); *Y02E 10/566* (2013.01); *Y02E 40/72* (2013.01); *Y02E 60/722* (2013.01); *Y02E 60/7838* (2013.01); *Y02E 70/30* (2013.01); *Y04S 10/123* (2013.01); *Y04S 10/14* (2013.01); *Y04S 40/124* (2013.01); *Y10T 307/336* (2015.04)

(58) Field of Classification Search
CPC ........ H02J 9/062; Y02E 40/72; Y02E 10/563; Y02E 10/566; Y02E 60/722; Y02E 60/7838; Y02E 70/30; Y10T 307/336; Y04S 10/14; Y04S 40/124; Y04S 10/123
See application file for complete search history.

(56) References Cited

U.S. PATENT DOCUMENTS

| | | | |
|---|---|---|---|
| 2005/0084745 A1* | 4/2005 | Colello | H01M 8/04679 429/61 |
| 2006/0087284 A1 | 4/2006 | Phillips et al. | |
| 2008/0129249 A1 | 6/2008 | Ishishita | |
| 2010/0123434 A1* | 5/2010 | Iwata | H02J 7/0016 320/118 |
| 2010/0295503 A1 | 11/2010 | Bourilkov et al. | |
| 2011/0175451 A1 | 7/2011 | Moon | |
| 2012/0089261 A1 | 4/2012 | Kim | |
| 2012/0133337 A1* | 5/2012 | Rombouts | H02J 3/32 320/155 |
| 2012/0223670 A1 | 9/2012 | Kinjo et al. | |
| 2012/0249078 A1 | 10/2012 | Kim et al. | |
| 2013/0241495 A1* | 9/2013 | Min | H02J 3/32 320/134 |

* cited by examiner

SECURITY CONCEPT FOR INTEGRATING A BATTERY INTO AN INVERTER

CROSS REFERENCE TO RELATED APPLICATIONS

This application claims priority to PCT Application number PCT/EP2012/074929 filed on Dec. 10, 2012, the contents of which are incorporated by reference in its entirety.

FIELD

The present disclosure relates to an inverter apparatus. Especially, the present disclosure relates to an inverter apparatus for converting electric power from a renewable energy source, whose functionality is enhanced by the potential to store electric energy in a battery. Further, the disclosure relates to a method of operating such an inverter apparatus.

BACKGROUND

John Wynne: "Akkus auf den Zahn gefühlt" (http://www.elektroniknet.de/power/technik-know-how/batterienakkus/article/27123/0/Akkus_auf_den_Zahn_gefuehlt/) discloses a photovoltaic power plant in which a photovoltaic generator is connected to a DC/DC converter. The DC/DC converter is connected to an AC/DC converter feeding AC electric power into a power grid. Battery stacks which buffer the electric energy from the photovoltaic generator are provided between two lines connecting the DC/DC converter to the AC/DC converter. The batteries of the battery stacks are monitored by two independent monitoring systems. A controller controlling both the DC/DC converter and the AC/DC converter receives a battery cell status from the monitoring systems.

WO 2009/066880 A2 discloses a high-power, large-capacity battery module including a plurality of battery cells or unit modules connected in series to each other. A battery management system (BMS) is provided for protecting the battery cells from overcharge, overdischarge and overcurrent. The BMS detects and controls the operation of the battery module. When an abnormality of the battery module assembly is detected, the BMS switches a power switch unit to become off such that the charging and discharging operation of the battery module is interrupted. This interruption has a strong impact on any apparatus to which the battery module is connected.

There is a strong need for an enhanced integration of a battery in an inverter apparatus.

SUMMARY

The present disclosure relates to an inverter apparatus comprising a DC voltage link, an input stage connected to the DC voltage link and configured to receive DC electric power from a DC power generator for loading the DC voltage link, a DC/AC converter connected to the DC voltage link and configured to feed AC electric power into a power grid, and a bidirectional connection configured to connect a battery to the DC voltage link, to load the battery out of the DC voltage link and to load the DC voltage link out of the battery. The inverter apparatus further comprises a controller configured to operate the DC/AC converter and the bidirectional connection. The controller is connected to an interface configured to receive present values of relevant parameters of the battery from a battery monitoring unit associated with the battery. The relevant parameters of the battery issued by the battery monitoring unit and received by the interface both include working data related to at least a state of charge of the battery and safety data indicating a safety state of the battery. The controller operates the bidirectional connection dependently on the present values of the relevant parameters of the battery in that it considers the working data in operating the bidirectional connection, and in that it is commanded by the safety data in operating the bidirectional connection.

Further, the present disclosure relates to a method of operating an inverter apparatus which includes a DC voltage link, an input stage connected to the DC voltage link, a DC/AC converter connected to the DC voltage link, and a bidirectional connection connected to the DC voltage link. The method comprises connecting a DC power generator to the input stage and loading the DC voltage link with DC electric power received from the DC power generator; operating the DC/AC converter to feed AC electric power into a power grid; connecting a battery to the DC voltage link via the bidirectional connection; and, dependently on present values of relevant parameters of the battery, operating the bidirectional connection to load the battery out of the DC voltage link, or to load the DC voltage link out of the battery. Further, the method comprises receiving the present values of the relevant parameters of the battery from a battery monitoring unit associated with the battery, the relevant parameters of the battery received include working data related to at least a state of charge of the battery and safety data indicating a safety state of the battery; considering the working data in operating the bidirectional connection; and following commands by the safety data in operating the bidirectional connection.

Other features and advantages of the present disclosure will become apparent to one with skill in the art upon examination of the following drawings and the detailed description. It is intended that all such additional features and advantages be included herein within the scope of the present disclosure, as defined by the claims.

BRIEF DESCRIPTION OF THE DRAWINGS

The disclosure will be described and explained with reference to the accompanying drawings. The components in the drawings are not necessarily to scale, emphasis instead being placed upon clearly illustrating the principles of the present disclosure. In the drawings, like reference numerals designate corresponding parts throughout the several views.

FIG. 2 shows details of a communication between a controller of the inverter apparatus according to FIG. 1 and a battery management unit of a battery connected to this inverter apparatus, and.

DETAILED DESCRIPTION

Figure 1:
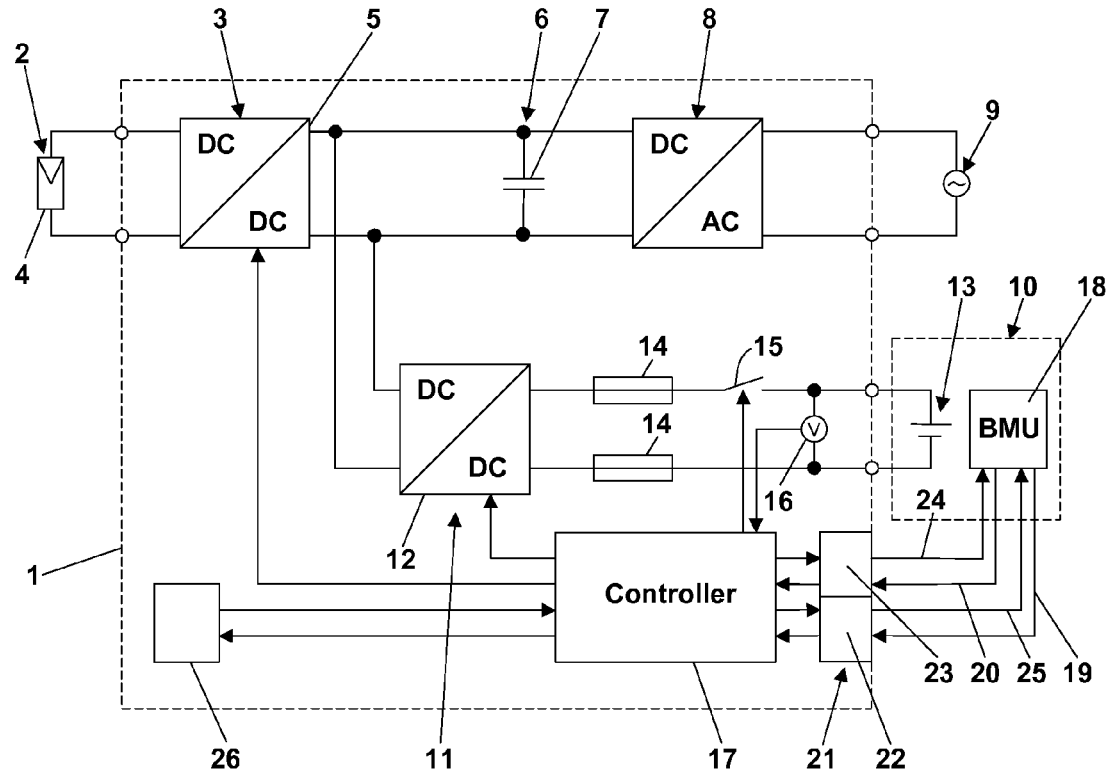
FIG. 1 is a schematic circuit diagram of an inverter apparatus according to a first embodiment.

The present disclosure relates to an inverter apparatus. Especially, the present disclosure relates to an inverter apparatus for converting electric power from a renewable energy source, whose functionality is enhanced by the potential to store electric energy in a battery. Further, the disclosure relates to a method of operating such an inverter apparatus.

The battery may, for example, be used to store electric power from a DC power generator which is at present not needed in a power grid, or to supply electric power needed in the power grid which is at present not available from the DC power generator. Such situations may particularly occur when the power generator is a photovoltaic generator or an electric machine of a wind mill so that the generation of electric power by the power generator is dependent on weather conditions and solar altitude (in case of a photovoltaic generator).

A battery, however, only has a limited storage capacity. Thus, the state of charge (SOC) of the battery has to be considered in charging and discharging operations. This may be done by monitoring the voltage of the battery. This voltage, however, only represents one of the relevant parameters of the battery. These relevant parameters also include the present temperature of the battery, present maximum or minimum loading or charging currents, present maximum or minimum unloading or discharging currents and the so-called "state of health" (SOH), which is an indicator for the battery long term degradation process.

The inverter apparatus of the present disclosure is configured to integrate all functions needed to safely operate a battery connected to the inverter apparatus. Thus, a battery module comprising the battery may be kept simple. Particularly, neither electrical nor mechanical switches are needed in the battery module.

According to the present disclosure, the inverter apparatus is enabled to this integration by cooperating with a battery monitoring unit associated with the battery in the battery module. The battery monitoring unit provides present values of all relevant parameters of the battery to the controller of the inverter apparatus. The battery monitoring unit for example measures the temperature of the battery and any other relevant parameters, like for example individual battery cell voltages. It may also derive maximum or minimum loading or unloading currents allowed in the present state of the battery. Further, the SOC and SOH of the battery may be calculated. However, the battery monitoring unit does not need to concern itself with keeping the present values of the relevant parameters of the battery within the allowed range. This is done by the controller of the inverter dependent on the relevant parameters of the battery.

According to the present disclosure the controller of the inverter apparatus considers working data related to at least a state of charge of the battery and operates the bidirectional connection accordingly. These working data are considered by the controller in addition to other data like, for example, the electric power presently provided by a DC power generator or electric power demanded by a power grid connected to the inverter apparatus. As a security measure, however, the relevant parameters of the battery which the controller receives from the battery monitoring unit also include safety data indicating a safety state of the battery. These safety data are not just considered by the controller. Instead, the controller is commanded by the safety data in operating the bidirectional connection. This particularly means that the controller is commanded to stop further operation of the bidirectional connection and disconnect the battery by opening suitable switches of the bidirectional connection. These actions will be executed by the controller which is commanded by the safety data independently of any data from other sources. Due to the direct effect the safety data have on the operation of the bidirectional connection, the battery module may in fact be kept simple and need not have its own switches for a safety cut-off, for example.

The different kinds of data received by the controller of the inverter apparatus according to the present disclosure and their different degree of relevance may be reflected by separate interface units for receiving the working data and the safety data. Further, these interface units may be different. In one embodiment, the interface unit for the working data includes a CAN-bus interface unit. In the same or another embodiment of the inverter apparatus according to the present disclosure, the interface unit for the safety data is configured to receive a hardware signal. The term "hardware signal" here refers to a signal comprising only two different states which can be processed at a hardware level without any software interpretation needed. For example these two states are two different voltage levels, or in case of a toggled hardware signal these two states may be a presence versus absence of that signal.

In a more detailed embodiment of the inverter apparatus according to the present disclosure, the controller is configured to receive the safety data as a safety signal only indicating safety of the battery at a signal level within a predetermined safety level range and/or at a signal repetition frequency within a predetermined safety frequency range. Thus, for example, the safety signal may indicate no safety at a signal level below a safety threshold level value and/or a signal repetition frequency below a safety threshold frequency value. Only as long as the safety signal is in the safety range(s), the controller regularly operates the bidirectional connection. As soon as the safety signal is no longer indicating safety of the battery, the operation of the bidirectional connection is interrupted and the battery is disconnected.

The safety signal may be provided by the controller and transmitted to the battery monitoring unit via the interface, and the interface may be configured to only return the safety signal at its original signal level and/or at its original signal repetition frequency to the controller, if the battery is safe. In this embodiment, the safety signal as provided by the controller already qualifies as a "battery safe signal". In one embodiment, however, the safety signal as provided by the controller is not yet indicating a safe battery. In this embodiment, the safety signal will only be converted by the monitoring unit into a "battery safe signal" before it is returned to the controller, if the whole battery module functions properly. Such a conversion of the safety signal requires an action by the properly functioning monitoring unit and may, thus, not be provided by a short circuit. The conversion of the safety signal may, for example, consist of a shift of the signal level or of doubling the signal repetition frequency to get it into the safety level range and/or the safety frequency range, respectively.

In addition to different interface units for receiving the working data and the safety data, the inverter apparatus may comprise different controller units for processing the working data and the safety data. In one embodiment, the controller unit for the working data may be a freely programmable controller unit, whereas the controller unit for the safety data may be a fixedly programmed controller unit. The programming of the freely programmable controller unit may be altered to adapt the controller to fulfil varying purposes in operating the bidirectional connection. Such purposes may be an optimization of the local consumption of the power produced, e.g. by a PV-generator or feeding the energy in a public grid at times when the feed-in fee is highest or supporting grid stability of the connected public grid.

In contrast to the freely programmed controller unit the fixed programmed controller unit for the safety data can not be manipulated, and thus no safety function can be deactivated erroneously.

In a more detailed embodiment, the controller unit for the working data includes a digital signal processor (DSP), and the controller unit for the safety data includes a field programmable gate array (FPGA).

The working data provided by the battery monitoring unit may also include battery and battery monitoring unit identification data. These data may be issued by the battery monitoring unit at least during start-up of the battery monitoring unit and/or when requested by the controller of the inverter apparatus according to the present disclosure. In one example, the battery and battery monitoring unit identification data may include battery monitoring unit software version information. This identification data may be processed by a predefined procedure so that the identification data is verified. In general, the battery and battery monitoring unit identification data indicate whether the controller is able to suitably operate the bidirectional connection considering the working data. Thus, the controller may only operate the bidirectional connection for loading the battery out of the DC voltage link or for loading the DC voltage link out of the battery, if the battery and battery monitoring unit identification data indicate compatibility of the battery and the battery monitoring unit with the inverter apparatus.

The safety data, however, are not dependent on the particular battery or battery monitoring unit or software version of the battery monitoring unit. The controller of the inverter apparatus according to the present disclosure will only operate the bidirectional connection, if the safety signal transmitted to the battery monitoring unit is returned and the returned safety signal indicates safety of the battery.

In one embodiment, the bidirectional connection comprises a bidirectional DC/DC converter operated by the controller. In the same or another embodiment, the bidirectional connection comprises an electrical cut-off switch and a mechanical cut-off switch operated by the controller. The mechanical cut-off switch operated by the controller may comprise an AC print relay. In combination with the electrical cut-off switch, the simple and cost-effective AC print relay is sufficient for permanently cutting off the battery if no safety of the battery is given. If a fault current occurs, the fault current is securely interrupted by cut-off fuses which may be comprised in the controller or the battery module.

The interface unit for receiving the working data from the battery monitoring unit may be configured to allow for bidirectional communication between the controller of the inverter apparatus and the battery monitoring unit. This bidirectional communication may not only be helpful for sending requests for particular working data from the controller to the battery monitoring unit. The bidirectional interface unit may also be used for programming the battery monitoring unit or for updating software in the battery monitoring unit. This means that the entire or a significant amount of the external communication of the battery monitoring unit may take place via the bidirectional interface unit, i.e. with the controller of the inverter apparatus. This is a further aspect according to one embodiment allowing to keep the battery monitoring unit and the battery very simple.

The battery module comprising the battery and the battery monitoring unit may be arranged inside or outside a housing of the inverter apparatus of the present disclosure. This may depend on the size of the battery, for example.

The battery may comprise a plurality of battery cells, and the inverter apparatus may have more than one bidirectional connection each configured to connect one battery to the same DC voltage link or to separate DC voltage links.

Taking the inverter apparatus of the present disclosure and the battery module together, there is a reduction in the number of components due to multiple use of security elements in the inverter apparatus. Further benefits are a higher packaging density which results in a compact housing design and simplifies mounting of the combined installation. Thus, the inverter apparatus of the present disclosure provides an inverter with battery in a compact and cost-saving design.

Referring now in greater detail to the drawings, FIG. 1 schematically depicts an inverter apparatus 1. A DC power generator 2 is connected to an input stage 3 of the inverter apparatus 1. The DC power generator 2 is a photovoltaic generator 4, in one embodiment. The input stage 3 includes a DC/DC converter 5 loading a DC voltage link 6 comprising at least one capacitor 7 with DC electric power from the DC power generator 2. A DC/AC converter 8 of the inverter apparatus 1 converts the DC electric power from the DC voltage link 6 into AC electric power and feeds this AC electric power into an external power grid 9. Further, a battery module 10 is connected to the DC voltage link 6 via a bidirectional connection 11 of the inverter apparatus 1. The bidirectional connection 11 includes a bidirectional DC/DC converter 12 and serves for either loading a battery 13 of the battery module 10 with DC electric power out of the DC voltage link 6 or for loading the DC voltage link 6 with DC electric power from the battery 13, as needed. The bidirectional connection 11 further comprises cut-off fuses 14, a mechanical cut-off switch 15 and a voltmeter measuring the voltage of the battery 13. The voltage measured by the voltmeter 16 is considered by a controller 17 of the inverter apparatus 1, i.e. the controller 17 operates the DC/DC converter 12 inter alia depending on the voltage measured by the voltmeter 16. The controller 17 also operates the DC/AC converter 8 and the DC/DC converter 5. This particularly means that the controller 17 provides control signals to all switches in the converters 5, 8, 12. The controller 14 also operates the cut-off switch 15 to cut off the battery 13 from the bidirectional connection 11 and thus from the inverter apparatus 1. There are further relevant parameters besides the voltage provided by the battery 13 which should be considered by the controller 17 in operating the bidirectional connection 11 as this operation results in currents flowing to the battery 13 for loading the battery or from the battery 13 for loading the DC voltage link 6. These parameters for example include the temperature of the battery 13 or the present minimum or maximum currents from or to the battery 13 or the present maximum or minimum allowable voltage across the battery 13. The present values of these parameters are provided by a battery monitoring unit 18 of the battery module 10. The battery monitoring unit 18 provides these present values as working data 19, on the one hand, and as safety data 20, on the other hand. The working data 19 are related to at least a state of charge of the battery 13, and they are considered by the controller 17 of the inverter apparatus 1 together with other data depending on a control program running in the controller 17. The safety data 20 indicate a safety state of the battery 13 to the controller 17. To be absolutely sure that any unsafe condition of the battery 13 results in a cut-off of the battery 13 from the inverter 1, the safety data 20 command the controller 17 to directly undertake the necessary steps for this cut-off without any freedom to the controller 17. An interface 21 via which the controller 17 communicates with the battery monitoring unit 18 comprises dedicated interface units 22 and 23 for receiving the working data 19 and the safety data 20 separately transmitted by the battery monitoring unit 18. Further, the safety data 20 are based on a safety signal 24 forwarded from the controller 17 via the interface unit 23 to the battery monitoring unit 18. The battery monitoring unit 18 is only able to convert the safety signal, i.e. to alter it with regard to its level and/or frequency, for example, and to return the converted safety signal as the safety data 19, if the battery monitoring unit 18 operates properly, and if the battery 13 monitored by the battery monitoring unit 18 is safe. Otherwise, the battery monitoring unit 18, if it returns the safety signal 24 at all, returns it at its original level and frequency which indicates to the controller 17 that something is wrong and that the battery 13 should be disconnected from the inverter apparatus 1, if it is already connected to it at all. At least, the bidirectional connection 11 should not be further operated regularly. However, it may be operated for securely discharging the battery 13, if a too high battery voltage indicates an unsafe over-charged state of the battery, or for securely loading the battery 13, if a too low battery voltage indicates an unsafe over-discharged state of the battery, for example. In these ways a de-escalation of the unsafe states is provided returning the battery into a safe state and avoiding a failure requiring external service of the inverter apparatus or the battery module.

The interface unit 22 also allows for bidirectional communication between the controller 17 and the battery monitoring unit 18. Thus, the controller 17 may send requests 25 for the present values of certain parameters to the battery monitoring unit 18 or even forward software to the battery monitoring unit 18 for programming it. Thus, the battery monitoring unit 18 and the entire battery module 10 may only be connected to the inverter apparatus 1 and only communicate with the inverter apparatus 1, whereas the controller 17 of the inverter apparatus 1 may also be able to communicate to the outside via a further interface 26 connecting it to the Internet, for example.

Figure 2:
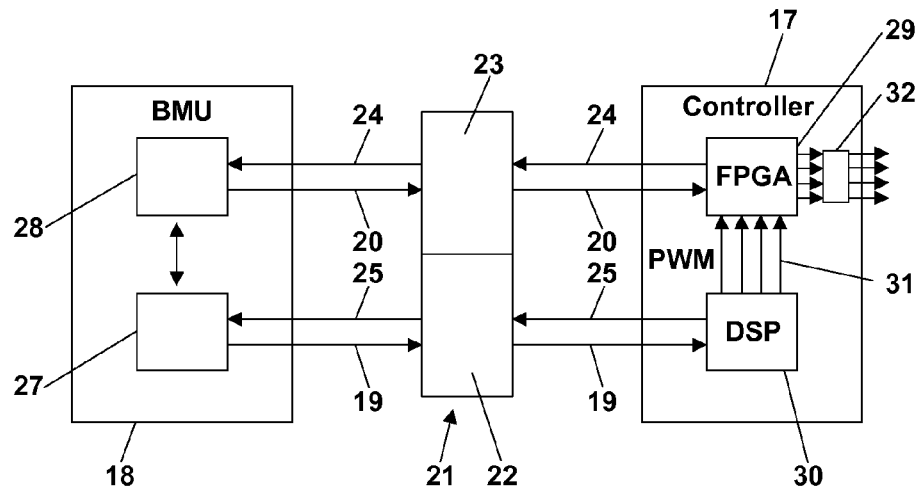

FIG. 2 illustrates that the safety data 20 and the working data 19 are not only forwarded via different interface units 22 and 23 of the interface 21 which may be a CAN-bus interface unit for handling the requests 25 and the working data 19 and an interface unit 23 forwarding the safety signal 24 to the battery monitoring unit 18 and returning the safety data 20 to the controller 17, but that these data are also handled by separate components of the battery monitoring unit 18 and the controller 17. The battery monitoring unit 18 may comprise two separate chips 27 and 28 communicating with each other and providing a redundant system so that the safety data 20 only indicate safety of the battery module if everything is working properly. The safety data 20 are processed by a fixed programmed controller unit 29 of the controller 17 which may also forward the safety signal 24. The requests 25 are sent and the working data 19 are received by a freely programmable controller unit 30 of the controller 17 which, based on these and other data, provides driver signals 31 to a driver 32 for the various switches of the converters 5, 8 and 12 as well as for the mechanical switch 15 according to FIG. 1. However, the driver signals 31 are selectively forwarded by the controller unit 29 depending on the safety state of the battery. If no safety is given, at least the operation of the DC/DC converter 12 according to FIG. 1 is stopped and the switch 15 according to FIG. 1 is no longer closed but opened.

Figure 3:
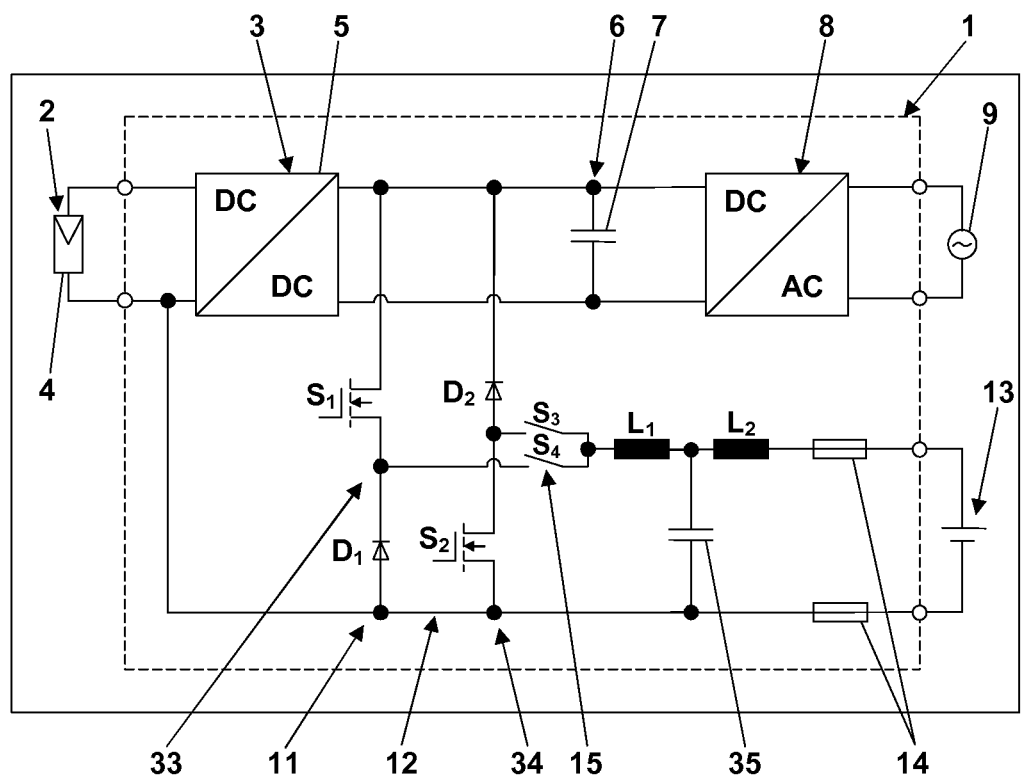
FIG. 3 is a schematic circuit diagram of an inverter apparatus according to another embodiment.

FIG. 3 shows another embodiment of the inverter apparatus 1 and provides more details with regard to the bidirectional DC/DC converter 12. The voltmeter 16, the controller 17, the battery monitoring unit 18 and the interfaces 21 and 26 are not shown here, although they will also be present in this embodiment. The bidirectional DC/DC converter 12 comprises a buck converter 33 including a switch $S_1$ and a diode $D_1$ for loading the battery 13, and a boost converter 34 including a diode $D_2$ and a switch $S_2$ for loading the DC voltage link 6 out of the battery 13. The two converters 33 and 34 share a common inductor $L_1$, and they make use of the capacitor 7 of the DC voltage link 6 and of a further capacitor 35. The capacitor 35, together with a second inductor $L_2$, also serves as a filter between the converters 33 and 34 and the battery 13. The switch 15 here consists of two mechanical switches $S_3$ and $S_4$ which are printed AC relays and which are used to select between the buck converter 33 and the boost converter 34 for loading the battery 13 or loading the DC voltage link 6 out of the battery 13, respectively. The AC relays $S_3$ and $S_4$, however, do not need to cut off a flowing current. This is done by opening the switch $S_1$ when the AC relay $S_4$ is closed and by interrupting the pulsed operation of $S_2$ stopping a current from the battery 13 into the DC voltage link 6 only flowing due to the boosting operation of the boost converter 34 when the AC relay $S_3$ is closed. In this way, the controller (not depicted in FIG. 3) may also cut off the battery 13 using the switches $S_1$ to $S_4$ if commanded by the safety data from the battery monitoring unit. Any fault currents occurring are interrupted by the fuses 14.

Many variations and modifications may be made to the preferred embodiments of the disclosure without departing substantially from the spirit and principles of the disclosure. All such modifications and variations are intended to be included herein within the scope of the present disclosure, as defined by the following claims.

The invention claimed is:

1. An inverter apparatus comprising:
   a DC voltage link,
   an input stage coupled to the DC voltage link and configured to receive DC electric power from a DC power generator for loading the DC voltage link,
   a DC/AC converter coupled to the DC voltage link and configured to feed AC electric power into a power grid,
   a bidirectional connection configured to couple a battery to the DC voltage link (6), to load the battery out of the DC voltage link in a first direction, and to load the DC voltage link out of the battery in a second, opposite direction, and
   a controller configured to operate the DC/AC converter and, dependent on present values of relevant parameters of the battery, to selectively operate the bidirectional connection in the first direction or the second direction,
   wherein the controller is coupled to an interface configured to receive the present values of the relevant parameters of the battery from a battery monitoring unit associated with the battery,
   wherein the relevant parameters of the battery issued by the battery monitoring unit and received by the interface include working data related to at least a state of charge of the battery and safety data indicating a safety state of the battery,
   wherein the controller is configured to consider the working data in operating the bidirectional connection,
   wherein the controller is configured to be commanded by the safety data (20) in operating the bidirectional connection, wherein the interface comprises separate interface units configured to receive the working data and the safety data, respectively, and wherein the controller is configured to receive the safety data as a safety signal that indicates a safety of the battery only when a signal level of the safety signal is within a predetermined safety level range and/or when a signal repetition frequency of the safety signal is within a predetermined safety frequency range.

2. The inverter apparatus of claim 1, wherein the interface units for the working data and the safety data are different.

3. The inverter apparatus of claim 1, wherein the interface unit for the working data comprises a CAN-bus interface unit and/or wherein the interface unit for the safety data is configured to receive a hardware signal.

4. The inverter apparatus of claim 1, wherein the controller is configured to transmit, via the interface, the safety signal to the battery monitoring unit.

5. The inverter apparatus of claim 4, wherein the controller is configured to transmit the safety signal at a signal level outside the predetermined safety level range and/or at a signal repetition frequency outside the predetermined safety frequency range.

6. The inverter apparatus of claim 1, wherein the controller comprises different controller units for processing the working data and the safety data.

7. The inverter apparatus of claim 6, wherein the controller unit for the working data comprises a freely programmable controller unit and that the controller unit for the safety data comprises a fixedly programmed controller unit.

8. The inverter apparatus of claim 7, wherein the controller unit for the working data comprises a digital signal processor (DSP) and that the controller unit for the safety data comprises a field programmable gate array (FPGA).

9. The inverter apparatus of claim 1, wherein the working data comprises battery and battery monitoring unit identification data at least during start-up of the battery monitoring unit or when requested by the controller.

10. The inverter apparatus of claim 9, wherein the battery and battery monitoring unit identification data include battery monitoring unit software version information.

11. The inverter apparatus of claim 9, wherein the controller only operates the bidirectional connection for loading the battery out of the DC voltage link or for loading the DC voltage link out of the battery, if the battery and battery monitoring unit identification data indicate compatibility of the battery and the battery monitoring unit with the inverter apparatus.

12. The inverter apparatus of claim 1, wherein the bidirectional connection comprises a bidirectional DC/DC converter operated by the controller.

13. The inverter apparatus of claim 1, wherein the bidirectional connection comprises at least one electrical cut-off switch and at least one mechanical cut-off switch operated by the controller.

14. The inverter apparatus of claim 13, wherein the at least one mechanical cut-off switch operated by the controller comprises an AC print relay.

15. The inverter apparatus of claim 1, wherein the battery is arranged within a housing enclosing the inverter apparatus.

16. The inverter apparatus of claim 15, wherein the battery is part of an interchangeable battery module including the battery monitoring unit.

17. A method of operating an inverter apparatus that comprises:
a DC voltage link,
an input stage coupled to the DC voltage link,
a DC/AC converter coupled to the DC voltage link, and
a bidirectional connection coupled to the DC voltage link,
the method comprising:
connecting a DC power generator to the input stage and loading the DC voltage link with DC electric power received from the DC power generator;
operating the DC/AC converter to feed AC electric power into a power grid;
connecting a battery to the DC voltage link via the bidirectional connection; and
dependent on present values of relevant parameters of the battery, operating the bidirectional connection to load the battery out of the DC voltage link, or to load the DC voltage link out of the battery;
receiving the present values of the relevant parameters of the battery from a battery monitoring unit associated with the battery, wherein the received relevant parameters of the battery include working data related to at least a state of charge of the battery and safety data indicating a safety state of the battery;
considering the working data in operating the bidirectional connection;
following commands by the safety data in operating the bidirectional connection;
receiving the working data and the safety data via separate interface units; and
receiving the safety data as a safety signal that indicates safety of the battery only when a signal level of the safety signal is within a predetermined safety level range and/or when a signal repetition frequency of the safety signal is within a predetermined safety frequency range.

18. The method of claim 17, wherein the working data and the safety data are received via different interface units.

19. The method of claim 17, further comprising transmitting the safety signal to the battery monitoring unit.

20. The method of claim 19, wherein transmitting the safety signal is performed at a signal level outside the predetermined safety level range and/or at a signal repetition frequency outside the predetermined safety frequency range.

21. The method of claim 17, wherein the working data and the safety data are processed in different controller units.

22. The method of claim 17, wherein the bidirectional connection is only operated for loading the battery out of the DC voltage link or for loading the DC voltage link out of the battery, if battery and battery monitoring unit identification data included in that the working data indicate compatibility of the battery and the battery monitoring unit.

* * * * *